United States Patent [19]

Watanabe et al.

[11] Patent Number: 4,952,180
[45] Date of Patent: Aug. 28, 1990

[54] COWLING FOR OUTBOARD MOTOR

[75] Inventors: Eifu Watanabe; Gaku Hashimoto, both of Hamamatsu, Japan

[73] Assignee: Sanshin Kogyo Kabushiki Kaisha, Hamamatsu, Japan

[21] Appl. No.: 340,857

[22] Filed: Apr. 20, 1989

[30] Foreign Application Priority Data

Apr. 21, 1988 [JP] Japan .................................. 63-98750
Feb. 10, 1989 [JP] Japan .................................. 1-31645

[51] Int. Cl.$^5$ .......................................... B63H 21/26
[52] U.S. Cl. ........................................ 440/77; 440/88; 123/195 C
[58] Field of Search .................. 440/76, 77, 78, 88; 181/214, 229, 282; 123/195 C, 195 E

[56] References Cited

U.S. PATENT DOCUMENTS 3,610,198 10/1971 Alexandrowicz ...................... 440/77
4,522,602  6/1985 Okazaki ................................. 440/77
4,632,662 12/1986 Handa .................................... 440/77
4,734,070  3/1988 Mondek ................................. 440/77

FOREIGN PATENT DOCUMENTS 53-9696    1/1978 Japan .
54-163496 11/1979 Japan .
56-48999   4/1981 Japan .
56-157694 12/1981 Japan .
30493      2/1986 Japan .................................... 440/77

Primary Examiner—Sherman D. Basinger
Assistant Examiner—Stephen P. Avila
Attorney, Agent, or Firm—Ernest A. Beutler

[57] ABSTRACT

Two embodiments of protective cowlings for the power head of an outboard motor that form both forwardly and rearwardly facing air inlet openings so as to insure adequate air induction to the engine. The forwardly facing air inlet opening is located so as to avoid water being able to enter into the interior of the protective cowling and into the engine induction system.

9 Claims, 6 Drawing Sheets

4,952,180

COWLING FOR OUTBOARD MOTOR

BACKGROUND OF THE INVENTION

This invention relates to a cowling for an outboard motor and more particularly to an improved protective cowling and air inlet device for the power head of an outboard motor.

It is well known with outboard motors that the powering internal combustion engine is normally enclosed within a protective cowling so as to provide protection for the internal combustion engine and a better appearance for the outboard motor. The protective cowling defines a cavity in which the internal combustion engine is contained. It is also well known that the engine must be supplied with copious amounts of air for the engine induction system. Conventionally, the protective cowling includes a rearwardly positioned, generally upwardly facing air inlet that will permit air to flow into the cavity of the protective cowling for supply to the engine induction system. It is normally the practice to provide a further cowling member that extends across this air inlet so as to prevent foreign objects from falling into the inlet and which defines with the remaining portion of the cowling a rearwardly facing air inlet opening. Rearwardly facing air inlet openings are normally incorporated so as to insure that water will not enter into the interior or the protective cowling and damage the engine and/or enter the induction system of the engine. However, such devices provide a generally restricted air inlet opening and this can adversely affect the power output of the engine.

It is, therefore, a principal object of this invention to provide an improved protective cowling and air inlet device for the power head of an outboard motor which will provide adequate air flow to the engine induction system.

It is a further object of this invention to provide a protective cowling and air inlet device for the power head of an outboard motor that offers adequate air flow and yet will insure that water cannot enter the engine induction system or the cavity which surrounds the engine.

SUMMARY OF THE INVENTION

This invention is adapted to be embodied in a protective cowling and air inlet device for the power head of an outboard motor that comprises an internal combustion engine having an induction system. A first cowling assembly surrounds the engine the defines a generally closed cavity in which the engine is placed. Air inlet means are formed in an upper rear surface of the first cowling assembly for supplying atmospheric air to the cavity for the engine induction system. A second cowling assembly is affixed to the first cowling assembly and provides a closure extending across the air inlet means but spaced therefrom to define a flow path for air to the air inlet means. A forwardly facing air inlet opening is formed in the protective cowling for inducting air from the atmosphere for flow to the air inlet means. A rearwardly facing air inlet opening is also formed in the protective cowling for inducting air from the atmosphere for flow to the air inlet means.

DETAILED DESCRIPTION OF THE PREFERRED EMBODIMENTS

Figure 1:
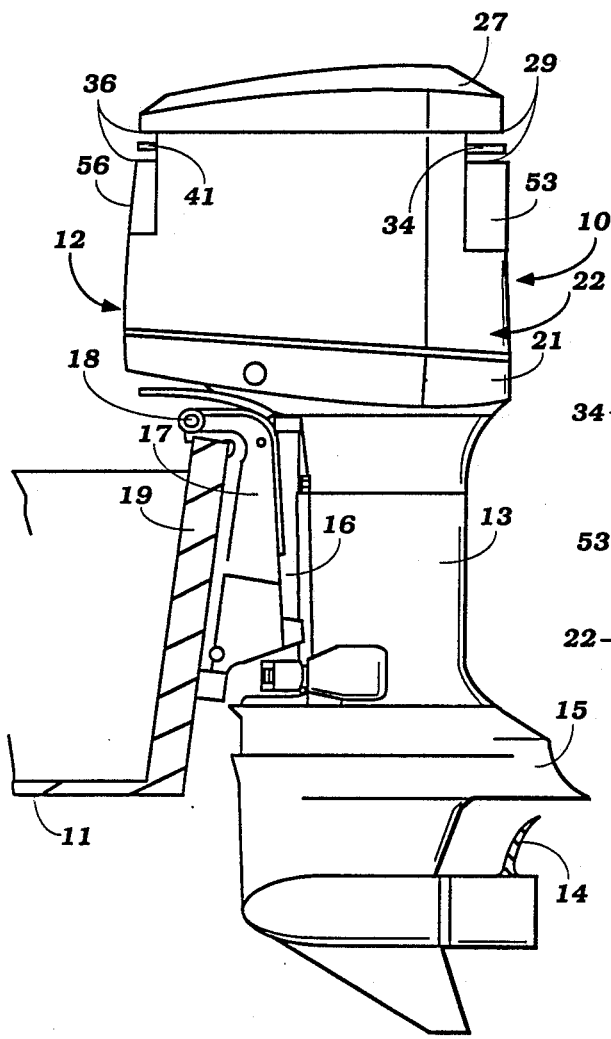
FIG. 1 is a side elevational view of an outboard motor constructed in accordance with a first embodiment of the invention.
Figure 2:
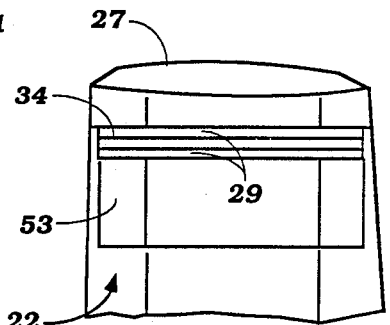
FIG. 2 is a partial rear elevational view of the power head of the outboard motor.

Referring first to FIG. 1, an outboard motor constructed in accordance with an embodiment of the invention is identified generally by the reference numeral 10 and is shown at attached to an associated watercraft 11. The outboard motor 10 includes a power head, indicated generally by the reference numeral 12, that contains an internal combustion engine and which is surrounded by a protective cowling and air inlet device constructed in accordance with a first embodiment of the invention. The internal combustion engine (which is not shown in any detail in the figures and which may be of any known type) drives an output shaft which, in turn, drives a drive shaft that is journaled for rotation within a drive shaft housing 13 that depends from the power head 12. This drive shaft (not shown) drives a propeller 14 of a lower unit 15 by means of a conventional forward, reverse transmission (not shown).

A steering shaft is affixed to the drive shaft housing 13 in a known manner and is supported for steering movement about a generally vertically extending steering axis within a swivel bracket assembly 16. The swivel bracket assembly 16 is, in turn, pivotally connected to a clamping bracket 17 by means of a pivot pin 18 for tilt and trim movement of the outboard motor 10. The clamping bracket 17 includes means for affixing the outboard motor 10 to a transom 19 of the watercraft 11. The construction of the outboard motor 10 as thus far described may be considered to be conventional and, for that reason, those components which are not illustrated and which have not been described in any more detail may take the form of any of the known components used in this field.

Figure 3:
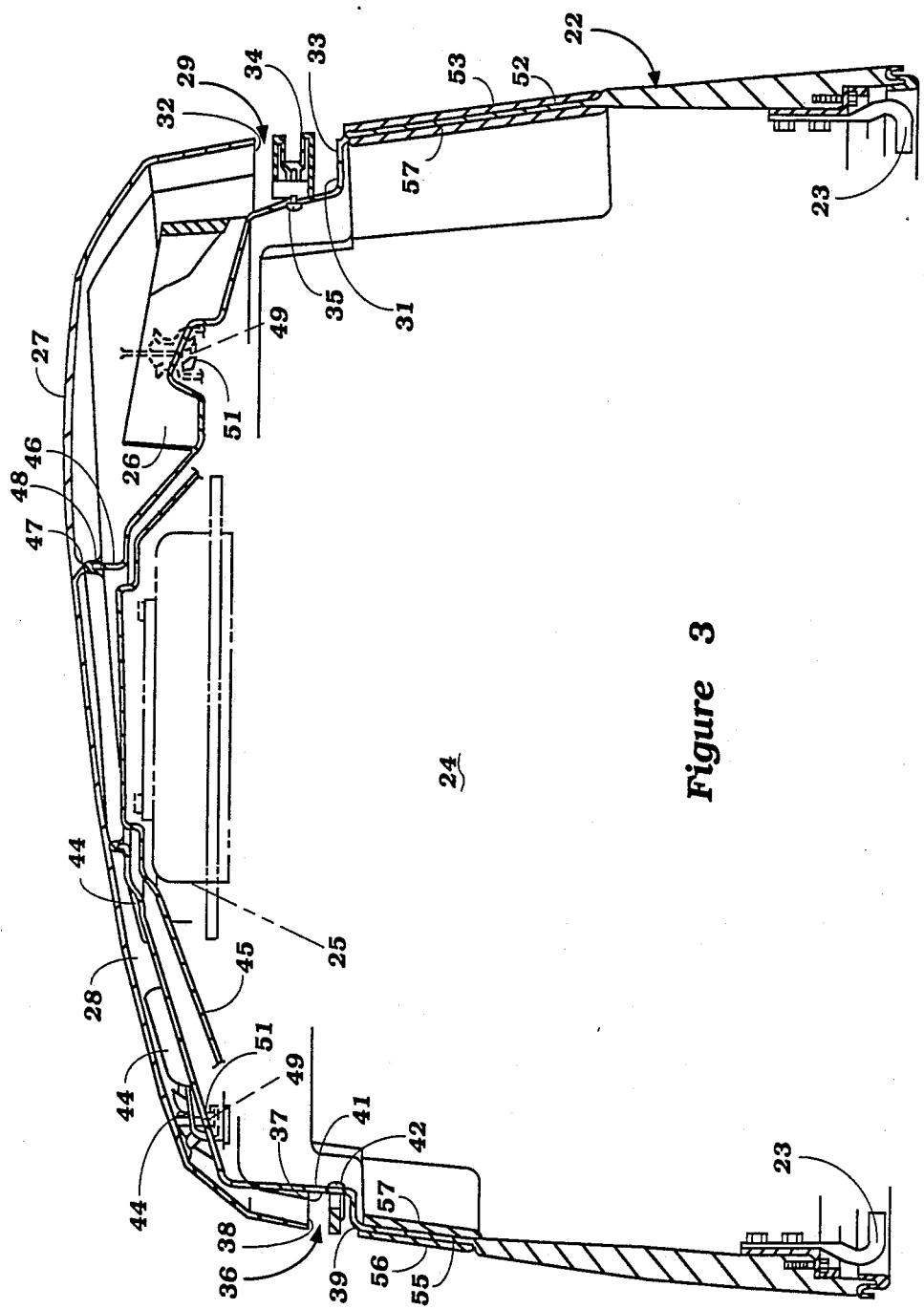
FIG. 3 is an enlarged cross-sectional view taken along a plane extending parallel to the plane of FIG. 1 and shows components of the protective cowling.
Figure 4:
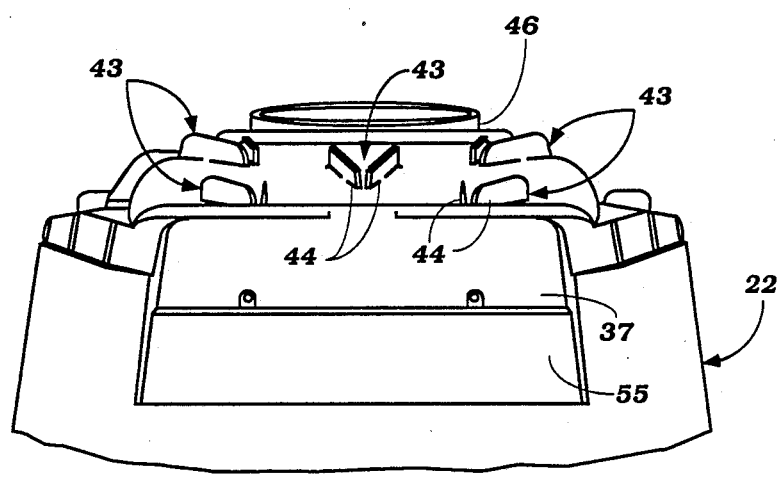
FIG. 4 is a front elevational view of the upper portion of the first cowling assembly with the second cowling assembly removed.
Figure 5:
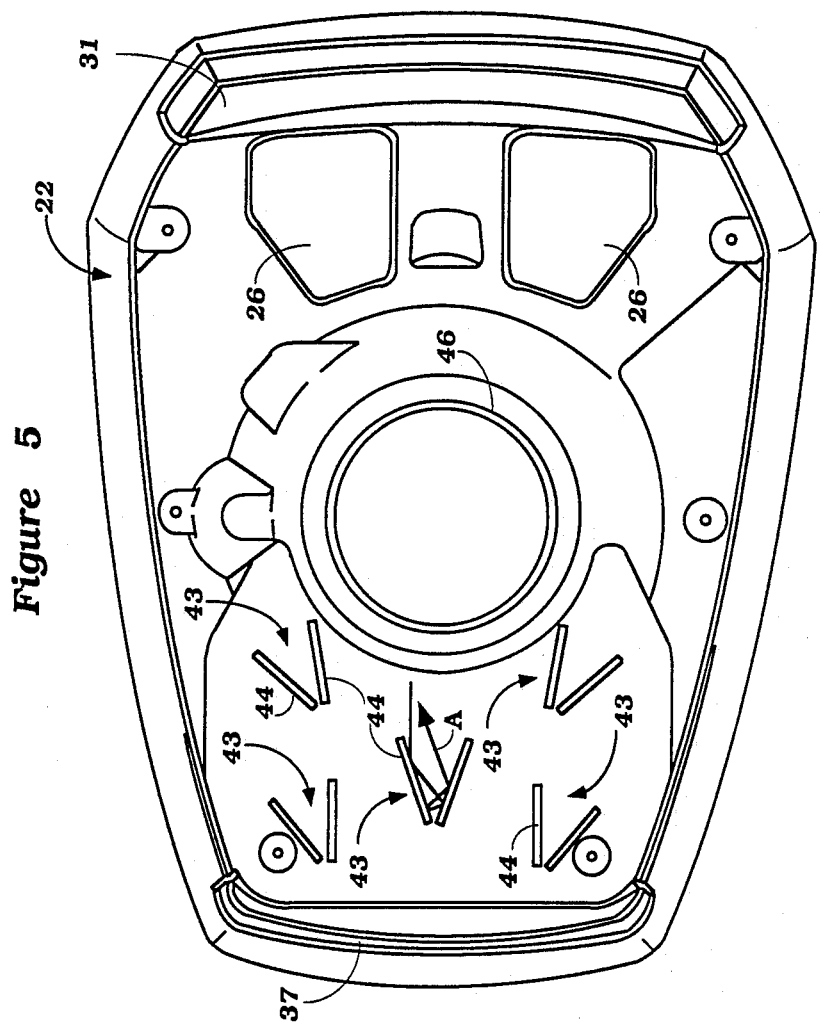
FIG. 5 is an enlarged top plan view of the first cowling assembly with the second cowling assembly removed.

Referring now in detail to the remaining figures of this embodiment (FIGS. 2 through 5), the protective cowling of the power head 12 is comprised of a first cowling assembly that includes a tray 21 that is affixed to the lower end of the internal combustion engine and a top cover, indicated generally by the reference numeral 22 and formed from a lightweight plastic material. The top cover 22 has a generally inverted cup shape and carries a pair of latch keepers 23 (FIG. 3) that are formed at the lower end thereof for cooperation with releasable latch mechanisms (not shown) carried by the tray 21 for detachably afffixing the top cover 22 and tray 21 to each other. When so affixed, this first cowling assembly defines a cavity 24 in which the internal combustion engine, which appears only partially in FIG. 3 wherein its flywheel 25 is depicted in phantom, is contained.

The engine contained within the cavity 24 obviously includes an induction system and air must be applied to this induction system through a suitable inlet since the first cowling assembly generally fully encloses the internal combustion engine. There are, therefore, formed a pair of upwardly opening air inlet means or openings 25 in the upper rear surface of the top cowling member 22. The air inlet openings 25 are spaced relative to each other but are generally rearwardly positioned. The air inlet means 25 have sufficient flow area so as to adequately serve the induction system needs of the internal combustion engine of the power head 12.

A second cowling assembly, comprised of a single cowling member 27 and also formed from a lightweight plastic material, is affixed, in a manner to be described, across the upper surface of the top portion of the top cowling member 22 of the first cowling assembly so as to prevent articles from falling directly into the cavity 24 through the air inlet openings 25. There is, however, defined a cavity 28 between the cowling assembly 27 and top cover member 22 so as to afford adequate air flow into the air inlet openings 25.

In order to permit air to flow into the cavity 28, there is provided a rearwardly facing air inlet opening, indicated generally by the reference numeral 29. The inlet opening 29 is formed by a recess 31 or indentation in the top cowling member 22 of the first cowling assembly. A rear peripheral flange 32 of the second cowling assembly 27 is spaced upwardly from an upwardly facing shoulder 33 formed by the indentation 31 so as to afford an air inlet passage. A baffle plate 34 is affixed across a portion of the opening 29 and is held to the top cowling member 22 by spaced fasteners 35 so as to afford adequate air flow into the induction system from the rear.

In addition, there is provided a forwardly facing air inlet opening 36 which, like the rear inlet opening 29, is formed by an indentation 37 of the top cowling member 22. This opening 36 is completed by means of a lower peripheral flange 38 of the cowling assembly 27 that is spaced from the upwardly facing shoulder 39 formed by the indentation 37. A further baffle plate 41 extends across the opening 36 and is held in place by spaced fasteners 42 so as to prevent large foreign objects from entering into the cavity 28.

Because the inlet opening 37 is formed downwardly, there is a tortuous air flow path from the inlet opening 36 to the air inlet openings 25 of the first cowling assembly so as to resist the likelihood that water can enter into the cavity 24. In order to further provide against the passage of water into the air inlet openings 26, there are formed a plurality of baffle pairs 43 each of which is comprised of a pair of angularly related baffles 44. The baffles 44 are disposed at an angle so as to further create a tortuous air flow path and to separate any water from the air that may flow in through the forward facing opening 36. In addition, the baffles 44 are angled in such a way that any sound waves emanating into the cavity 28 from the air inlet openings 26 will be reflected back away from the front of the outboard motor as shown by the arrow A in FIG. 5 so as to insure against the emanation of noises from the forward facing air inlet 36.

It should be noted that there is provided an internal baffle plate 45 that is affixed to the internal combustion engine and which overlies the flywheel 25. There is provided a raised peripheral flange 46 at the central portion of the top cowling 22 that is engaged by a corresponding flange 47 of the second cowling assembly 27 with a sealing gasket 48 being positioned therebetween. In addition, the cowling assembly 27 is held to the top cowling member 22 by means of a plurality of bosses formed on the cowling assembly 27 in which are molded bolts or studs 49 so as to accommodate attachment by means of nuts 51. As a result of this interaction between the top cowling member 22 and the second cowling assembly 27, the top portion of the protective cowling assembly is quite rigid and a person can stand on it without damaging it.

The area immediate beneath the rearwardly facing inlet opening 29 is formed with a reduced thickness section 52 to which a name plate or the like 53 may be attached in any known manner. An elastomeric pad 57 is affixed across the rear face of the thin section 52 for sound deadening. In a like manner, there is provided a reduced thickness section 55 below the forwardly facing opening 36 to which a name plate or the like 56 may be affixed in a suitable manner. A further sound deadening pad 57 is affixed to the rear of this thin section 55 for sound deadening.

Figure 6:
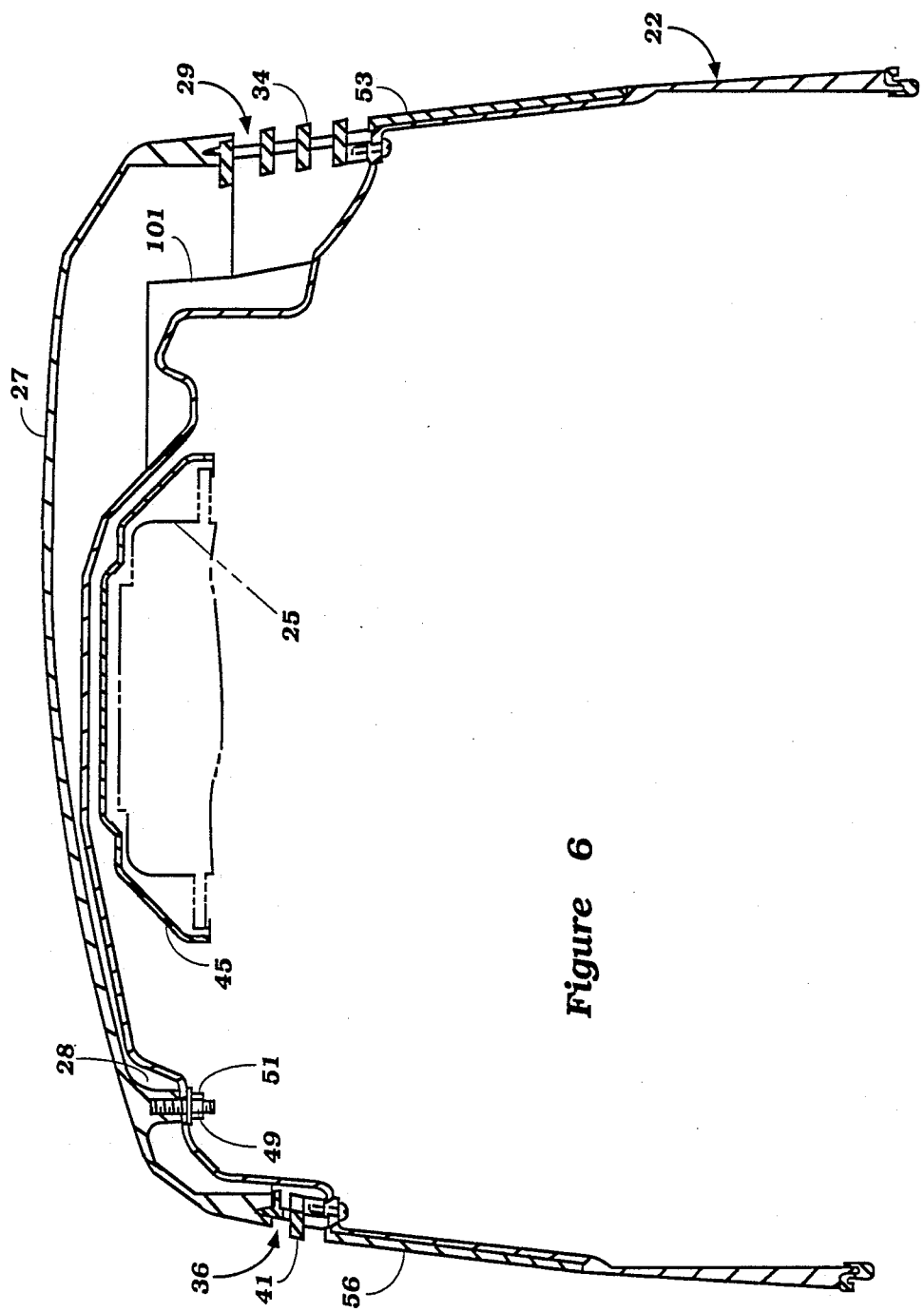
FIG. 6 is a cross-sectional view, in part similar to FIG. 3, showing another embodiment of the invention.
Figure 7:
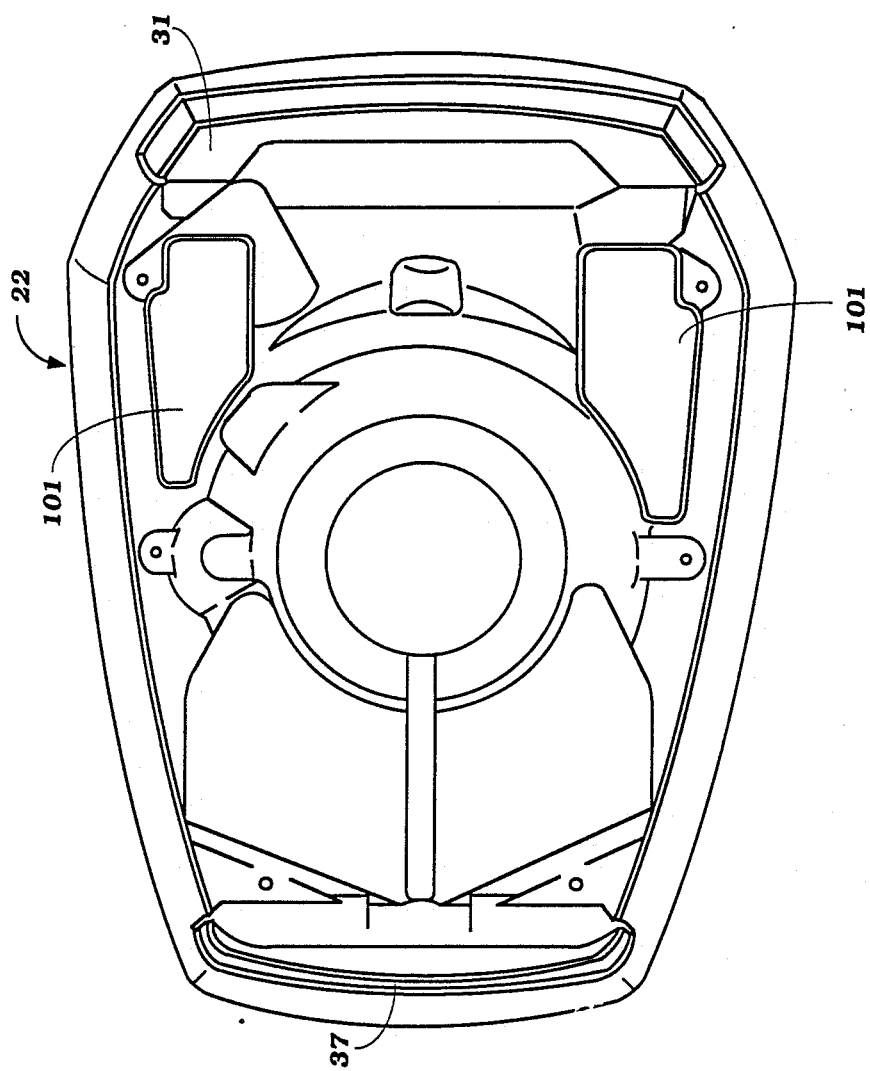
FIG. 7 is a top plan view of the first cowling assembly of this embodiment with the second cowling assembly removed and is thus similar to FIG. 5.

FIGS. 6 and 7 show another embodiment of the invention which is generally similar to the previously described embodiment. In this embodiment, however, air inlet openings 101 are formed in the top cowling member 22 at a position spaced farther forwardly from the rear air inlet opening 29 and the inlet openings 101 have a substantially greater area so as to reduce the velocity of air flow and thus further prevent water entry. In this embodiment, the baffles 43 are not incorporated but it is to be understood that they could be incorporated. In addition, the baffle members 34 and 41 are formed so that they interlock with the second cowling assembly 27 as clearly shown in FIG. 6.

It should be readily apparent from the foregoing description that two embodiments of the invention have been illustrated and described and each of which is highly effective in providing adequate air flow for the internal combustion engine without the likelihood of water entering the engine induction system or the cavity which surrounds the engine. Although two embodiments of the invention have been illustrated and described, various changes and modifications may be made without departing from the spirit and scope of the invention, as defined by the appended claims.

We claim:

1. A protective cowling and air inlet device for the power head of an outboard motor comprised of an internal combustion engine having an induction system, a first cowling assembly surrounding said engine and defining a generally closed cavity in which said engine is placed, air inlet means formed in an upper rear surface of said first cowling assembly for supplying atmospheric air to said cavity for said engine induction system, a second cowling assembly affixed relative to said first cowling assembly and providing a closure extending across said air inlet means but spaced therefrom to define a flow path for air to said air inlet means, a forwardly facing air inlet opening formed in a front surface of said protective cowling for inducting air from the atmosphere for flow to said air inlet means, and a rearwardly facing air inlet opening formed in a rear surface of said protective cowling for inducting air from the atmosphere for flow to said air inlet means.

2. A protective cowling and air inlet device as set forth in claim 1 wherein at least one of the air inlet openings is formed at least in part by the second cowling assembly.

3. A protective cowling and air inlet device as set forth in claim 2 wherein both of the air inlet openings are formed at least in part by the second cowling assembly.

4. A protective cowling and air inlet device as set forth in claim 2 wherein the one air inlet opening is formed in part by a recessed portion of the first cowling assembly that cooperates with the second cowling assembly to define the respective air inlet opening.

5. A protective cowling and air inlet device as set forth in claim 4 wherein each of the air inlet openings is formed by cooperation of the second cowling assembly with a respective recess of the second cowling assembly.

6. A protective cowling and air inlet device as set forth in claim 1 further including baffle means for precluding the flow of water into the air inlet means from the forwardly facing air inlet opening.

7. A protective cowling and air inlet device as set forth in claim 6 wherein the baffle means are formed on the top of the first cowling assembly.

8. A protective cowling and air inlet device as set forth in claim 7 wherein the baffle means are disposed so as to reflect sounds emanating from the air inlet means away from the forwardly facing air inlet opening.

9. A protective cowling and air inlet device as set forth in claim 1 wherein the first cowling assembly comprises a lower tray and a top cover portion.

* * * * *